(12) United States Patent
Rutherford et al.

(10) Patent No.: US 9,151,884 B2
(45) Date of Patent: *Oct. 6, 2015

(54) FLUORESCENT VOLUME LIGHT SOURCE WITH ACTIVE CHROMPHORE

(75) Inventors: Todd S. Rutherford, Wyoming, OH (US); Roy A. Auerbach, Cincinnati, OH (US)

(73) Assignee: 3M INNOVATIVE PROPERTIES COMPANY, Saint Paul, MN (US)

(*) Notice: Subject to any disclaimer, the term of this patent is extended or adjusted under 35 U.S.C. 154(b) by 607 days.

This patent is subject to a terminal disclaimer.

(21) Appl. No.: 12/360,539

(22) Filed: Jan. 27, 2009

(65) Prior Publication Data

US 2009/0196046 A1 Aug. 6, 2009

Related U.S. Application Data

(60) Provisional application No. 61/025,569, filed on Feb. 1, 2008.

(51) Int. Cl.
*F21V 9/16* (2006.01)
*F21V 8/00* (2006.01)
(Continued)

(52) U.S. Cl.
CPC .............. *G02B 6/0003* (2013.01); *F21V 9/00* (2013.01); *F21Y 2101/02* (2013.01); *G02B 6/0011* (2013.01)

(58) Field of Classification Search
CPC ............... B32B 2307/412; B32B 2307/422; B32B 7/00; F21V 9/00; F21V 9/06; F21V 9/16; F21Y 2101/02; F21Y 2101/025; G02B 6/0003; G02B 6/0011

USPC .............. 362/296.02, 84, 260, 326–329, 555, 362/600, 607, 611–614, 616–620, 800, 806, 362/812; 385/14, 901, 146, 129–131; 359/265, 275, 321, 322, 326–329, 859; 428/688–690; 313/498–504
See application file for complete search history.

(56) References Cited

U.S. PATENT DOCUMENTS

| | | | |
|---|---|---|---|
| 3,317,738 A | 5/1967 | Piepenbrink et al. | |
| 3,610,729 A | 10/1971 | Rogers | |

(Continued)

FOREIGN PATENT DOCUMENTS

| | | |
|---|---|---|
| DE | 103 21 020 A1 | 12/2004 |
| EP | 1130451 A1 | 9/2001 |

(Continued)

OTHER PUBLICATIONS

Garwin, "The Collection of Light from Scintillation Counters" *Rev. Sci. Instruments*, vol. 31, pp. 1010-0111 (1960).

(Continued)

*Primary Examiner* — Hargobind S Sawhney
(74) *Attorney, Agent, or Firm* — Daniel J. Iden

(57) ABSTRACT

An illumination system, such as might be used for illuminating a projection system, includes at least a first source of incoherent light capable of generating light in a first wavelength range. The system includes at least one active chromophore layer, sandwiched by transparent materials into a multi-layer body. They active chromophore layer emits light in a second wavelength range, different from the first wavelength range, when illuminated by light in the first wavelength range. The multi-layer body has an extraction area and at least some of the light at the second wavelength is internally reflected within the body to the extraction area.

34 Claims, 3 Drawing Sheets

(51) Int. Cl.
*F21V 9/00* (2015.01)
*F21Y 101/02* (2006.01)

(56) References Cited

U.S. PATENT DOCUMENTS

| | | |
|---|---|---|
| 3,629,136 A | 12/1971 | Melamed et al. |
| 4,110,123 A | 8/1978 | Goetzberger et al. |
| 4,142,781 A | 3/1979 | Baur et al. |
| 4,149,902 A | 4/1979 | Mauer et al. |
| 4,173,495 A | 11/1979 | Rapp et al. |
| 4,292,959 A | 10/1981 | Coburn, Jr. |
| 4,298,802 A | 11/1981 | Quella et al. |
| 4,425,907 A | 1/1984 | Younghouse |
| 4,446,305 A | 5/1984 | Rogers et al. |
| 4,488,047 A | 12/1984 | Thomas |
| 4,488,074 A | 12/1984 | Marandet |
| 4,540,623 A | 9/1985 | Im et al. |
| 5,406,578 A | 4/1995 | Gross et al. |
| 5,448,404 A | 9/1995 | Schrenk et al. |
| 5,580,932 A | 12/1996 | Koike |
| 5,793,456 A | 8/1998 | Broer et al. |
| 5,816,238 A | 10/1998 | Burns et al. |
| 5,841,579 A | 11/1998 | Bloom et al. |
| 5,882,774 A | 3/1999 | Jonza et al. |
| 5,903,091 A | 5/1999 | MacLennan et al. |
| 5,949,933 A | 9/1999 | Steiner et al. |
| 5,974,059 A | 10/1999 | Dawson |
| 6,122,103 A | 9/2000 | Perkins et al. |
| 6,134,258 A | 10/2000 | Tulloch et al. |
| 6,172,668 B1 | 1/2001 | Baur |
| 6,229,939 B1 | 5/2001 | Komine |
| 6,272,269 B1 | 8/2001 | Naum |
| 6,332,688 B1 | 12/2001 | Magarill |
| 6,351,069 B1 | 2/2002 | Lowery et al. |
| 6,366,388 B1 * | 4/2002 | Hampp ............... 359/241 |
| 6,418,252 B1 | 7/2002 | Maitland |
| 6,504,301 B1 | 1/2003 | Lowery |
| 6,509,651 B1 | 1/2003 | Matsubara et al. |
| 6,517,213 B1 | 2/2003 | Fujita et al. |
| 6,580,097 B1 | 6/2003 | Soules et al. |
| 6,614,179 B1 | 9/2003 | Shumizu et al. |
| 6,685,341 B2 | 2/2004 | Ouderkirk et al. |
| 6,687,436 B2 | 2/2004 | Griffin |
| 6,744,960 B2 | 6/2004 | Pelka |
| 6,759,145 B2 | 7/2004 | Lin et al. |
| 6,769,773 B1 | 8/2004 | Wu |
| 6,771,325 B1 | 8/2004 | Dewald et al. |
| 6,784,603 B2 | 8/2004 | Pelka et al. |
| 6,806,648 B2 | 10/2004 | Shimizu et al. |
| 6,831,934 B2 | 12/2004 | Wang et al. |
| 6,869,206 B2 | 3/2005 | Zimmerman et al. |
| 6,879,609 B2 | 4/2005 | Schardt et al. |
| 6,898,020 B2 | 5/2005 | Ouchi |
| 6,917,399 B2 | 7/2005 | Pokorney et al. |
| 6,960,872 B2 | 11/2005 | Beeson et al. |
| 6,976,779 B2 | 12/2005 | Ohtsuki et al. |
| 6,991,358 B2 | 1/2006 | Kokogawa et al. |
| 6,995,355 B2 | 2/2006 | Rains et al. |
| 7,011,421 B2 | 3/2006 | Hulse et al. |
| 7,030,419 B2 | 4/2006 | Shin et al. |
| 7,040,774 B2 | 5/2006 | Beeson et al. |
| 7,108,416 B1 | 9/2006 | Ossawa |
| 7,147,332 B2 | 12/2006 | Connor |
| 7,293,907 B2 | 11/2007 | Kim et al. |
| 7,316,497 B2 | 1/2008 | Rutherford et al. |
| 7,390,617 B2 * | 6/2008 | Vargas et al. ............. 430/321 |
| 7,467,885 B2 | 12/2008 | Grötsch et al. |
| 7,678,507 B2 * | 3/2010 | Cole et al. ............. 430/1 |
| 7,742,216 B2 * | 6/2010 | Noh et al. ............. 359/265 |
| 7,839,072 B2 * | 11/2010 | Horiuchi et al. ............. 313/501 |
| 7,857,457 B2 | 12/2010 | Rutherford |
| 2004/0066471 A1 * | 4/2004 | Bierhuizen ............. 349/9 |
| 2005/0074216 A1 | 4/2005 | Irie |
| 2005/0135761 A1 | 6/2005 | Cannon et al. |
| 2005/0146652 A1 | 7/2005 | Yokoyama et al. |
| 2005/0147372 A1 | 7/2005 | Bourdelais et al. |
| 2005/0174658 A1 | 8/2005 | Long et al. |
| 2006/0002131 A1 | 1/2006 | Schultz et al. |
| 2006/0028620 A1 | 2/2006 | Conner |
| 2006/0227570 A1 * | 10/2006 | Rutherford et al. ............. 362/612 |
| 2007/0031097 A1 * | 2/2007 | Heikenfeld et al. ............. 385/129 |
| 2007/0275330 A1 * | 11/2007 | Bailey et al. ............. 430/311 |
| 2007/0279501 A1 | 12/2007 | Goto et al. |
| 2007/0279914 A1 | 12/2007 | Rutherford |
| 2007/0279915 A1 | 12/2007 | Rutherford |
| 2007/0280622 A1 | 12/2007 | Rutherford |
| 2008/0094829 A1 * | 4/2008 | Narendran et al. ............. 362/231 |
| 2008/0117500 A1 * | 5/2008 | Narendran et al. ............. 359/326 |
| 2008/0283864 A1 * | 11/2008 | LeToquin et al. ............. 257/101 |
| 2009/0067194 A1 * | 3/2009 | Sanchez ............. 362/618 |
| 2009/0162667 A1 * | 6/2009 | Radkov ............. 428/426 |

FOREIGN PATENT DOCUMENTS

| | | |
|---|---|---|
| EP | 1253787 A2 | 10/2002 |
| JP | 03 266584 | 11/1991 |
| JP | 03 295319 | 10/2003 |
| WO | WO 01/27962 | 4/2001 |
| WO | WO 2007/143325 | 12/2007 |

OTHER PUBLICATIONS

Goetzberger, et al., "Solar Energy Conversion with Fluorescent Collectors" *Appl. Phys.* vol. 14, pp. 123-139 (1977).

Goldberg, L. et al., "High Efficiency 3 W Side-Pumped Yb Fiber Amplifier and Laser," *Conference: Technical Digest, Summaries of Papers Presented at the Conferences on Lasers and Electro-Optics, Postconference Edition, CLEO '99, Conference on Lasers and Electro-Optics* (IEEE Cat. No. 99CH37013), pp. 11-12.

Hideur, A., et al., "High-Power Double-Clad Yb-Doped Fiber Laser," SPIE, vol. 4751, (2002), pp. 510-520.

Jacobs et al., "Measurement of Excited-State-Absorption Loss for $Ce^{3+}$ in $Y_3Al_5O^{12}$ and Implications for Tunable 5d→4f rare-earth lasers³)", Applied Physics Letters, vol. 33, (1978) p. 410.

Keil, "Radiance Amplification by a Fluorescence Radiation Converter",*J. Appl Phys.* vol. 40, No. 9, pp. 3544-3547 (1969).

Levitt et al., "Materials for Luminescent Greenhouse Colar Collectors" *Applied Optics*, vol. 16, No. 10, pp. 2684-2689 (1977).

Mauer et al., "Fluorescent Concentrator for Solar Energy Collection", *Research Disclosure*, vol. 129, p. 20, 1975.

Reinberg, A.R., et al., "GaAs: Si LED Pumped Yb-Doped YAG Laser," *Applied Physics Letters*, vol. 19, No. 1, pp. 11-13 (Jul. 1, 1971).

Rutherford, T.S., et al., "Yb:YAG and Nd:YAG Edge-Pumped Slab Lasers," *Optics Letters*, vol. 26, No. 13 (Jul. 1, 2001), pp. 986-988.

Shurcliff, "Radiance Amplification by Multi-Stage Fluorescence System" *J. Opt. Soc. Am.* vol. 41, No. 3, p. 209 (1951).

Steigerwald, D.A. et al., "Illumination with Solid State Lighting Technology", *IEEE Journal of Selected Topics in Quantum Electronics*, vol. 8, No. 2 (Mar.-Apr. 2002), pp. 310-320.

Weber, et al., "Luminescent Greenhouse Collector for Solar Radiation", *Applied Optics*, vol. 15, No. 11, pp. 2299-2300 (1976).

* cited by examiner

FLUORESCENT VOLUME LIGHT SOURCE WITH ACTIVE CHROMPHORE

CROSS REFERENCES TO RELATED APPLICATION

This application claims the benefit of U.S. Provisional Patent Application No. 61/025,569, Feb. 1, 2008 the disclosure of which is incorporated by reference herein in its entirety.

FIELD OF THE INVENTION

The invention relates to light sources, and particularly to light sources that may be used in illumination systems, for example projection systems.

BACKGROUND

The brightness of illumination sources is typically limited by the brightness of the light source used. For example, an illumination source that uses light emitting diodes (LEDs) typically has a brightness, measured in power per unit area per unit solid angle, the same as or less than that of the LEDs. The optics that collect the light from the LEDs will, at best, conserve the étendue of the LED source.

In some applications of illumination sources, such as projector illumination, illumination by LEDs is not a competitive option because the brightness of the LEDs that are currently available is too low. This is particularly a problem for the generation of green illumination light, a region of the visible spectrum where the semiconductor materials used in LEDs are less efficient at generating light.

Other types of light sources may be able to produce a sufficiently bright beam of light but also suffer from other drawbacks. For example, a high-pressure mercury lamp is typically able to provide sufficient light for a projection system, but this type of lamp is relatively inefficient, requires a high voltage supply, contains toxic mercury, and has a limited lifetime. Solid-state sources, such as LEDs are more efficient, operate at lower voltages, typically contain no mercury, and are therefore safer, and have longer lifetimes than lamps, often extending to several tens of thousands of hours.

SUMMARY OF THE INVENTION

The present disclosure is directed to an illumination system including a first Lambertian source of incoherent light capable of generating light in a first wavelength range, and a volume fluorescent light unit. The volume fluorescent unit includes an active thin chromophore layer that is illuminated by light in a first wavelength range and emits light in a second wavelength range. This active chromophore layer is sandwiched between a first and second layer that are transparent to light in both the first and second wavelengths. The volume fluorescent light unit also includes an extraction area, at which at least some of the light of the second wavelength exits the unit after traveling throughout the volume by means of internal reflection.

Additional description and implementations will be apparent from the detailed description of the preferred embodiment thereof, which proceeds with reference to the accompanying drawings.

BRIEF DESCRIPTION OF THE DRAWINGS

The present application may be more completely understood in consideration of the following description of various embodiments in connection with the accompanying drawings, in which.

Figure 1:
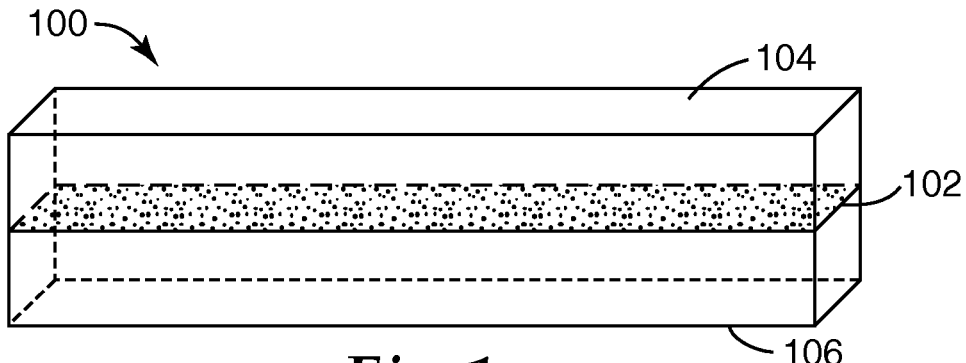
FIG. 1 schematically illustrates an embodiment of a volume fluorescent light unit.

Like numerals in different figures refer to similar elements. While the embodiments described are amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the invention as defined by the appended claims.

DETAILED DESCRIPTION

The presently described illumination systems are applicable to light sources and are more particularly applicable to light sources that are used in illumination systems where a high level of brightness is required. The application has identified a need for a solid-state light source that can be used in illumination systems that is brighter than current light sources but does not suffer from the shortcomings of high-pressure mercury lamp sources.

The brightness of a light source is measured in optical power (Watts) divided by the étendue. The étendue is the product of the area of the light beam at the light source times the square of the refractive index times the solid angle of the light beam. The étendue of the light is invariant, i.e., if the solid angle of the light beam is reduced without loss of the light, then the area of the beam is increased, e.g., by increasing the emitting area of the light source. Since the étendue is invariant, the brightness of the light generated by the light source can only be increased by increasing the amount of light extracted from the light source. If the light source is operating at maximum output, then the brightness of that light source can not be increased.

The optical power of the light beam may be increased through the use of additional light sources. There are limits, however, as to how much the optical power and brightness of the light beam can be increased by simply adding more light sources. The optical system that directs the light beam to the target generally only accepts light that is within certain aperture and cone angle limits. These limits depend on various factors, such as the size of the lenses and the f-number of the optical system. The addition of more light sources does not provide an unlimited increase in the optical power or brightness of the light beam because, at higher numbers of light sources, an increasingly smaller fraction of the light from an added light source lies within the aperture and cone angle limits of the optical system.

Illumination systems described herein are believed to be useful for producing a concentrated light source, having a relatively high brightness, using a number of light sources that have a relatively lower brightness, such as light emitting diodes. The light from the lower brightness light sources is used to optically pump a volume of fluorescent material. The body absorbs the light emitted by the low brightness light source and the fluorescent layer sandwiched within fluorescently emits light at a different wavelength. The fluorescent light is typically emitted isotropically by the fluorescent material. At least some of the fluorescent light can be directed within the volume of transparent layers surrounding the fluorescent layer to a light extraction area. A net increase in brightness can be achieved when the area for light entrance into the body is sufficiently large compared to the extraction area.

In the following description, the term fluorescence covers phenomena where a material absorbs light at a first wavelength and subsequently emits light at a second wavelength that is different from the first wavelength. The emitted light may be associated with a quantum mechanically allowed transition, or a quantum mechanically disallowed transition, the latter commonly being referred to as phosphorescence. If the fluorescent material absorbs only a single pump photon before emitting the fluorescent light, the fluorescent light typically has a longer wavelength than the pump light. In some fluorescent systems, however, more than one pump photon may be absorbed before the fluorescent light is emitted, in which case the emitted light may have a wavelength shorter than the pump light. Such a phenomenon is commonly referred to as up-conversion fluorescence. In some other fluorescent systems, light is absorbed by an absorbing species in the fluorescent material and the resulting energy transferred to a second species in the material non-radiatively, and the second species emits light. As used herein, the terms fluorescence and fluorescent light are intended to cover systems where the pump light energy is absorbed by one species and the energy is re-radiated by the same or by another species. One type of device is illustrated and described in U.S. patent application Ser. No. 11/092,284.

One particular embodiment of the invention is schematically illustrated in FIG. 1, which shows a view from the side and top of a volume fluorescent light unit 100 that has an active chromophore layer, 102, sandwiched between a first transparent layer, 104, and second transparent layer, 106.

The active chromophore layer, 102, can be made up of a number of different materials. Unlike many fluorescent light units in which the fluorescing or phosphorescing material must be dispersed throughout the unit and substantially transparent, the systems described herein may comprise only a thin slab of fluorescent or phosphorescent material rather than a full rod. This allows for a much greater variety of useable materials.

One possible embodiment exhibits a slurry of phosphor powder. An example of a desirable phosphor material is strontium thiogallate doped with Europium (SrGa2S4:Eu2+). Other examples include a wide range of phosphors developed for LED excitation including but not limited to such chemical families as gamets, silicates, nitridosilicates, oxo-nitridosilicates, and sialons.

This material can be placed in an adhesive that is thermosetting, or in a material that is photocurable. Materials such as thermoset silsesquioxane acrylate compounded with zirconium oxide are particular useful as they can be cured by either means. Exemplary embodiments of thermoset materials include Optimate, available from Nitto Denko (Osaka, Japan), which is a thin layer thermoset having a refractive index that can be tuned to index match, for instance, a phosphor powder (Optimate can be tuned to an RI from 1.59-1.78 at 589 nm).

The curing and photo-setting materials should have an index of refraction of 0.9 to 1.1 times that of the phosphorescent material in the active chromophore layer, 102.

In a further embodiment, the active chromophore layer, 102, may be a thin film of single crystal phosphor material. The thin film may be generated by a number of means, including but not limited to from a thin crystal slice, crystallization from a liquid, from a vapor deposition process of vacuum coating, molecular beam epitaxy, metal-organic chemical vapor deposition, etc. The luminescent material presents a smooth rather than powdered or slurried layer.

Other embodiments include phosphor-like materials that are nanoparticle sized where the particle size is much smaller than the wavelength of light interacting with it. The emitting material may have a particle size less of 100 nm or less, more preferably 60 nm or less, and even more preferably 30 nm or less.

The first layer, 104, and second layer, 106 are both substantially transparent to incoming light and light that has fluoresced or phosphoresced, preferably with higher refractive indexes. The layers may be composed of either the same or different materials. In one embodiment, the layers are made up of is yttrium aluminum garnet (YAG). Other crystalline materials such as cubic zirconia and sapphire can be used. In other embodiments, the layers 104 and 106 may be made of optically transparent glasses. The substantially transparent materials generally have a refractive index that matches the active chromophore layer, 102, within a few tenths of a refractive index unit, most desirably an n within 0.05-0.1.

Figure 2A:
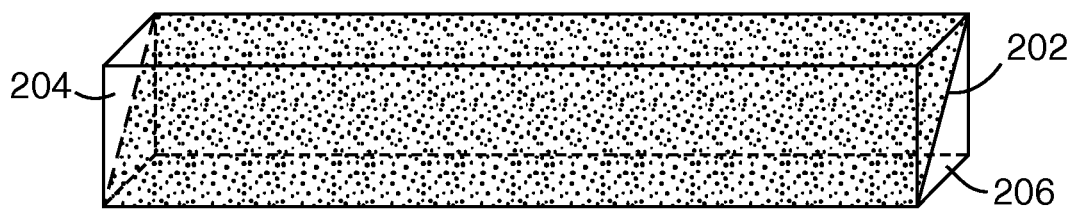
FIG. 2a schematically illustrates an embodiment of a volume fluorescent light unit wherein the fluorescent slab/layer is angled at 45 degrees with respect to the incident surface.
Figure 2B:
FIGS. 2b and 2c schematically illustrate embodiments of a volume fluorescent light unit with two fluorescent layers that orthogonally bisect one another where the slabs are angled parallel/orthogonal and at 45 degree angle to the incident surfaces respectively, splitting the transparent body into four sections.
Figure 2C:
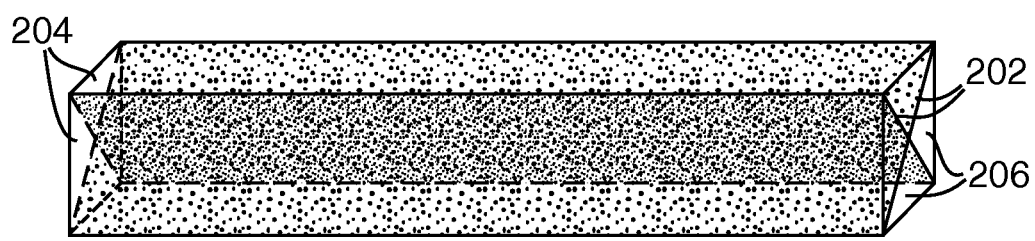

FIGS. 2a, 2b and 2c provide illustrations of other embodiments of volume fluorescent light units. FIG. 2a provides a similar structure to that presented in FIG. 1, except that the active chromophore layer, 202, sits diagonal or at a 45 degree angle to the surfaces of the volume unit. Thus, first layer, 204 and second layer, 206 are in the shape of triangular polyhedrons rather than rectangular polyhedrons.

It is also possible to create a volume light source with more than one layer of active chromophore, 202. These two layers may bisect one another and may either be placed parallel and orthogonal to the planes of the volume unit (as pictured in FIG. 2b) or may be placed at diagonal or 45 degree angles to the surfaces (as pictured in FIG. 2c). In the first of these figures (FIG. 2b), the first layer 204, and second layer, 206 are rectangular polyhedrons that are bisected by one of the chromophore layers, 202. In the second figure (FIG. 2c), the first and second layers, 204 & 206, respectively, are triangular polyhedrons that are bisected by one of the chromophore layers, 202. In all of these various embodiments, FIGS. 2a, 2b, and 2c, one advantage is the ability to excite the fluorescent or phosphorescent layer from both transverse angles. Thus, the layers can be illuminated from all directions.

Figure 3:
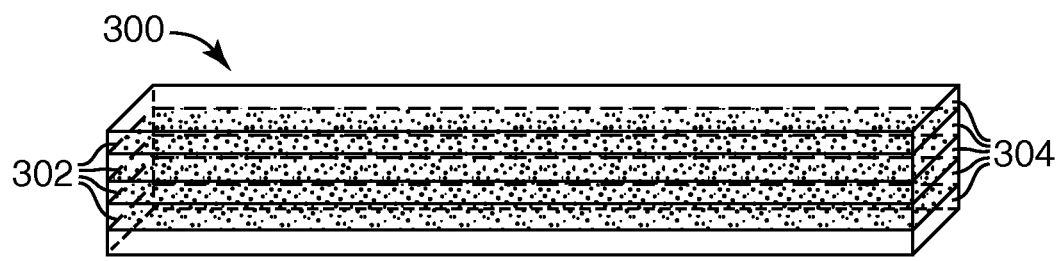
FIG. 3 schematically illustrates an embodiment of a volume fluorescent light unit with multiple sandwiched fluorescent layers.

One other embodiment is illustrated in FIG. 3. In this figure, the volume fluorescent light unit, 300, is made up of a number of sandwiched active chromophore layers, 302, each surrounded by transparent layers, 304. The materials making up both of these types of layers correspond with the types of materials discussed in FIG. 1. Stacking successively phosphor layers in one plane allows for a higher concentration of phosphor and thus more excitation of light per surface area of the volume unit. In addition, light may be pumped into the volume fluorescent light unit from one side and fluoresce multiple times as it moves through each successive layer. Upon each fluorescence, the light wavelength will change until the desired wavelength is reached. Reflective materials may be placed on the extraction end of the body adjacent to all layers besides that which emits the desired wavelength of light.

Figure 4:
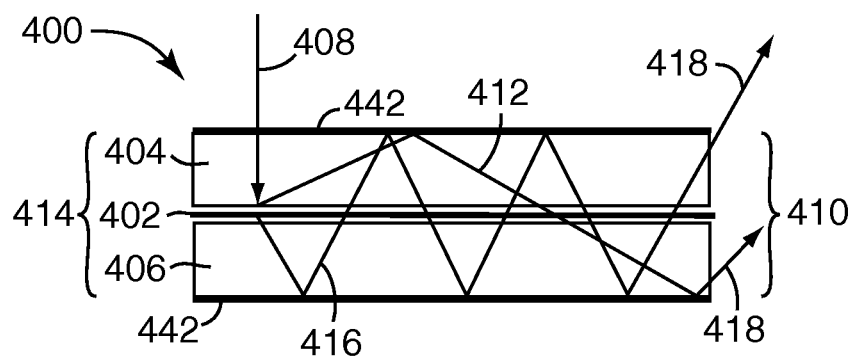
FIG. 4 schematically illustrates characteristics of light activity within an embodiment of a volume fluorescent light unit.

In yet another embodiment, the transporting of light through the substrate does not need to rely on TIR but can be facilitated by a dielectric coating or other means. Such a configuration is illustrated in FIG. 4. In this embodiment light, 408, enters into the first layer, 404. While one light ray of the second wavelength, 412 traverses through the first layers 404 and 406 via Total Internal Reflection, the other light ray of the second wavelength, 416 travels through via a different behavior. Applying a wide-band dielectric reflection coating, 442 to the face of both layers, 404 and 406, allows for propagation of a greater range of angles (see light ray 416). Because more of the light that enters can effectively be emitted by the volume fluorescent light unit, 400, the technique allows for a shorter length of the body and hence a reduced quantity of light sources (e.g., LEDs). Such a method which creates higher angles of emission, 418 at the extraction face, 410, benefit from using extraction devices described in FIGS. 7*a*, *b* & 8, or other variations on lighting and body shape, such as those illustrated in FIG. 6. Whether using TIR or dielectric coating, it is desirable that light entering the body (in a first wavelength range) may pass, while light fluoresced or phosphoresced is reflected off the surface.

Figure 5:
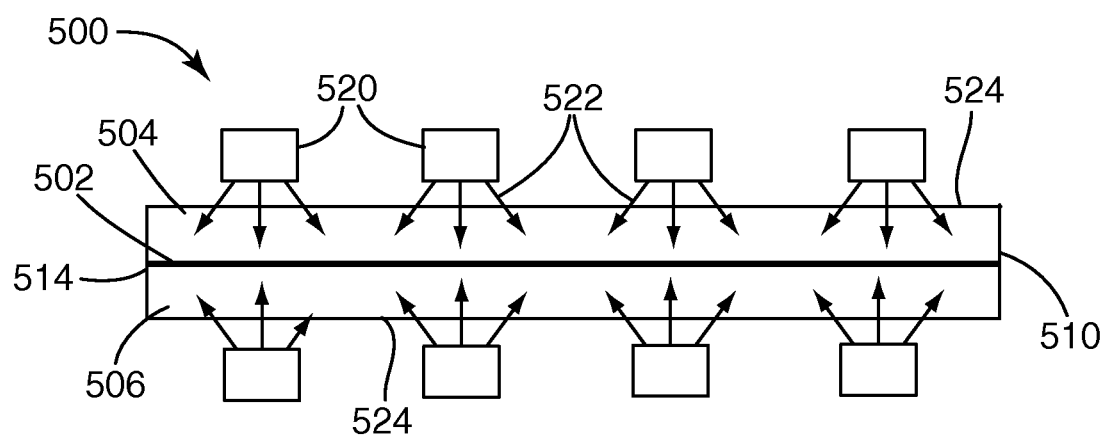
FIG. 5 schematically illustrates an embodiment of an illumination system comprised of a volume fluorescent light unit along with a plurality of light sources.

One particular embodiment is schematically illustrated in FIG. 5, which shows a top view of a volume fluorescent light unit (or illumination system) 500 that has an active chromophore layer, 502, sandwiched between a first layer, 504 and second layer, 506. Light is emitted by the light sources 520 and is dispersed in a Lambertian distribution pattern, 522 entering the unit. One light source used may be an LED. The light enters across the partially reflective surface, 524, and after phosphorescing or fluorescing upon interaction with the active chromophore layer, 502, it is totally internally reflected upon its return to the surface, 524 and is directed toward the extraction area, 510. Light that propagates in the direction opposite of the extraction area is reflected by the reflective rear face 514 on the other end of the body. The rear face can also be slanted so that it is not parallel to the extraction area.

Figure 6:
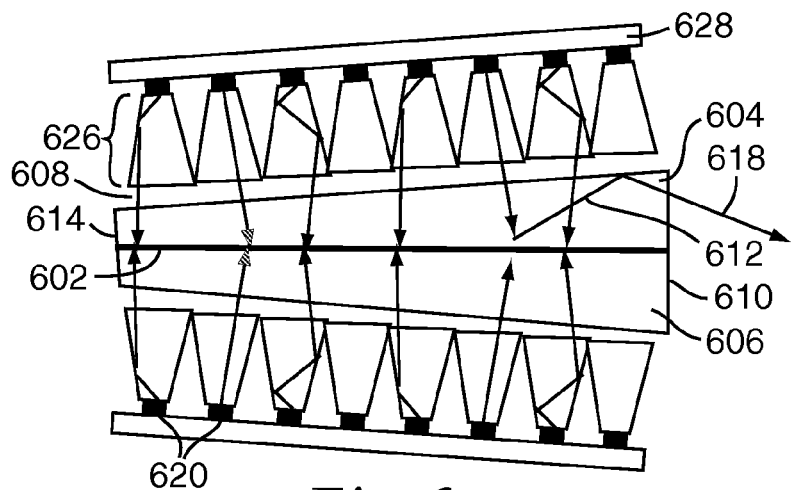
FIG. 6 schematically illustrates an embodiment of an illumination system comprised of a tapered volume fluorescent light unit with a plurality of collimated light sources.

One particular embodiment of an illumination system is illustrated in FIG. 6. The embodiment in FIG. 6 again contains a chromophore layer, 602. One important difference is that the first and second layers, 604 and 606 are tapered, with a greater surface area at the extraction area, 610, than at the rear face, 614. This allows for more light to reach the extraction area, 610, by channeling some of the light that is scattered upon interaction with the active chromophore layer, 602. In addition, light rays that reflect at angles less than those which experience TIR, may be effectively collimated by the time they reach the extraction face. As in FIG. 5, the illumination system has multiple Lambertian pattern-emitting light sources, 620. In this embodiment, however, the light sources are positioned on a reflective substrate, 628, allowing for a greater amount of light to ultimately enter the unit. The embodiment also demonstrates the positioning of collimator optics, 626, over the emission side of the light sources, 620. The combination of these two elements creates greater efficiency in the amount of light pumped through the unit by creating recycling and less light lost to the sides of the body. In addition, the collimation aspect allows for more spread out light sources, and thus greater heat distribution along the substrate, 628. Because the collimators produce more light at angles close to orthogonal, however, the embodiment is likely most effective when using the dielectric coating layer described in FIG. 4.

Figure 7A:
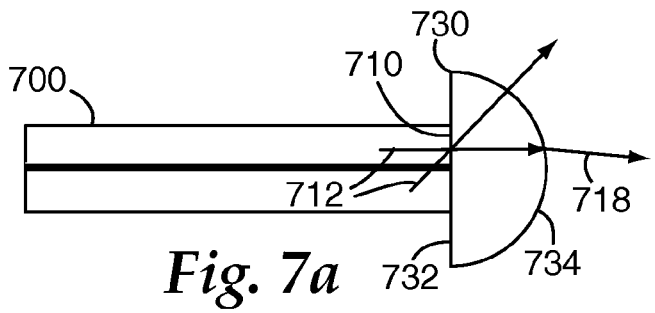
FIGS. 7a and 7b schematically illustrate embodiments of a volume fluorescent light unit with a lens-shaped extractor attached to the extraction end of the multi-layer body.
Figure 7B:
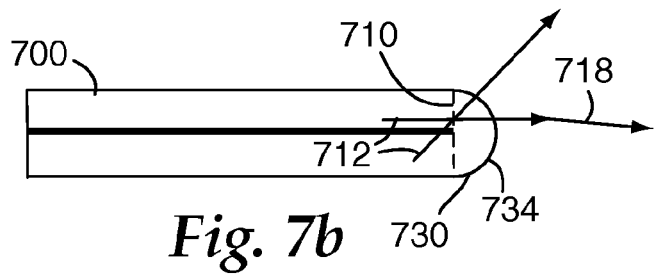

Two other embodiments are illustrated in FIGS. 7*a* & 7*b*. The embodiments demonstrate the addition of a lens output extractor, 730 optically coupled to the extraction face of the volume fluorescent light unit, 710. Light that has fluoresced or phosphoresced, 712, enters the lens body, 730 through the flat face, 732. Upon contact with the outer, concave face, 734, the light is collimated and emitted in a forward direction, 718. FIG. 7*a* provides an example with a larger lens, where the flat face of the lens, 732, is wider than the extraction area, 710. The width of the flat lens face may also be smaller, as exemplified in FIG. 7*b*. Either embodiment may effectively perform the desired function of allowing for a collimated extraction of fluoresced light that would otherwise emerge at undesirable angles.

Figure 8:
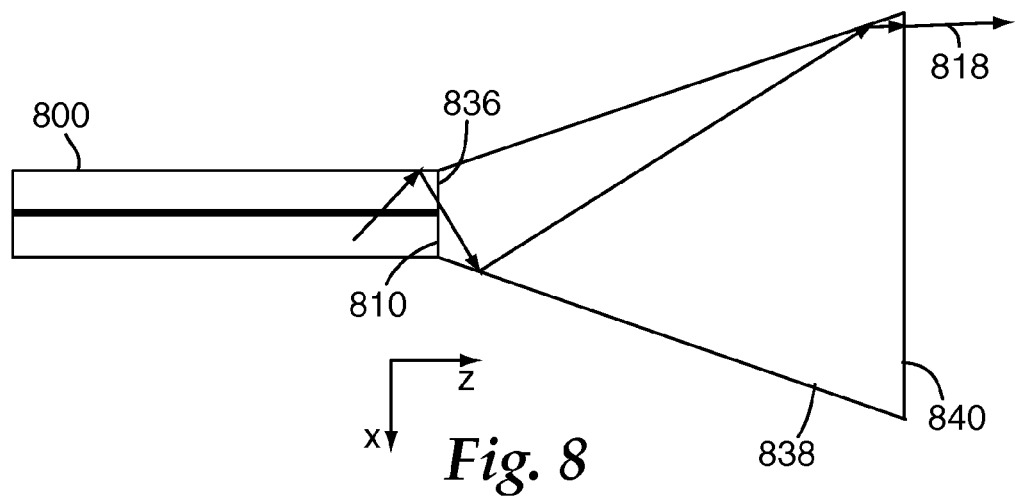
FIG. 8 schematically illustrates an embodiment of a volume fluorescent light unit with a tapered tunnel extractor attached to the extraction end of the multi-layer body.

Another embodiment which performs a similar function to the embodiments of FIGS. 7*a* & 7*b* is illustrated in FIG. 8. Here again, a volume fluorescent light unit 800 has a body that is optically coupled to an extraction device. The extraction device illustrated is a tapered tunnel extractor, 838. Light moves through the extraction face, 810 and tapered tunnel entry face, 836. Upon entry into the tapered tunnel, fluoresced light at high emission angles is collimated and emitted out of the tapered tunnel extraction face, 840 in a forward direction as collimated light, 818.

We claim:

1. An illumination system comprising:
    a first Lambertian source of incoherent light capable of generating light in a first wavelength range;
    a volume fluorescent light unit comprising
        an active thin chromophore film sandwiched between a first layer and a second layer, the first layer and second layer comprising a refractive index, and the active thin chromophore film comprising an emitting material that, when illuminated by light in the first wavelength range, emits light in a second wavelength range, different from the first wavelength range, the active thin chromophore film comprising an index of refraction that is within 0.1 of the refractive indexes of the first layer and second layer;
        further wherein each of the first layer and second layer is transparent to the light in the first and second wavelength range;
        the volume fluorescent light unit having an extraction area, at least some of the light at the second wavelength being internally reflected within the volume fluorescent light unit to the extraction area.

2. The system of claim 1 further comprising a second Lambertian source of incoherent light.

3. The system of claim 2 wherein the first Lambertian source of incoherent light and the second Lambertian source of incoherent light are disposed on different sides of the volume fluorescent light unit.

4. The system of claim 3 further comprising a light collimator associated with each incoherent light source, such that light entering the volume fluorescent light unit is collimated.

5. The system of claim 1 wherein the first and second layers comprise the same materials.

6. The system of claim 1 wherein the first source of incoherent light is a light emitting diode.

7. The system of claim 6 wherein the light emitting diode is disposed on a reflecting substrate.

8. The system of claim 1 wherein the first wavelength range is between about 400 nm and about 500 nm, and the second wavelength range is between about 500 nm and about 650 nm.

9. The system of claim 1 wherein the volume fluorescent light unit has a rear face opposing the extraction area, the rear face having a surface area substantially equal to the surface area of the extraction area.

10. The system of claim 1 wherein the volume fluorescent light unit has a rear face opposing the extraction area, the rear face having a surface area smaller than the surface area of the extraction area.

11. The system of claim 1 further comprising an output extractor disposed at the extraction area, the output extractor being optically coupled to extract the light in the second wavelength range out of the volume fluorescent light unit.

12. The system of claim 11 wherein the output extractor comprises a lens coupled to the volume fluorescent light unit.

13. The system of claim 11 wherein the output extractor is a tapered tunnel coupled to the volume fluorescent light unit.

14. The system of claim 1 wherein a reflective layer is provided on at least one surface of the volume fluorescent light unit.

15. The system of claim 14 wherein the reflective layer is transparent to light in the first wavelength range and substantially reflects light in the second wavelength range.

16. The system of claim 1 wherein the active thin chromophore film comprises a phosphorescent material.

17. The system of claim 16 wherein the phosphorescent material is a substantially single crystal phosphorescent material.

18. The system of claim 16 wherein the phosphorescent material comprises strontium thiogallate doped with Europium.

19. The system of claim 16 wherein the active thin chromophore film further comprises a thermoset material having a refractive index of from 0.9 to 1.1 times the refractive index of the phosphorescent material.

20. The system of claim 16 wherein the active thin chromophore film further comprises a photocurable material having a refractive index of from 0.9 to 1.1 times the refractive index of the phosphorescent material.

21. The system of claim 1 wherein the active thin chromophore film is substantially non-scattering of light in the second wavelength range.

22. The system of claim 21 wherein the emitting material has a particle size of 100 nm or less, more preferably 60 nm or less, and even more preferably 30 nm or less.

23. An illumination system comprising:
a first Lambertian source of incoherent light capable of generating light in a first wavelength range;
a volume fluorescent light unit comprising
an active chromophore layer sandwiched between a first layer and a second layer, the first layer and second layer comprising a refractive index, and the active chromophore layer comprising an emitting material that, when illuminated by light in the first wavelength range, emits light in a second wavelength range, different from the first wavelength range, the active chromophore layer further comprising an index of refraction that is within 0.1 of the refractive indexes of the first layer and second layer, wherein the first wavelength range is between about 400 nm and about 500 nm;
further wherein each of the first layer and second layer is transparent to the light in the first and second wavelength range;
the volume fluorescent light unit having an extraction area, at least some of the light at the second wavelength being internally reflected within the volume fluorescent light unit to the extraction area.

24. The system of claim 23 further comprising a second Lambertian source of incoherent light.

25. The system of claim 23 wherein the second wavelength range is between about 500 nm and about 650 nm.

26. The system of claim 23 further comprising an output extractor disposed at the extraction area, the output extractor being optically coupled to extract the light in the second wavelength range out of the volume fluorescent light unit.

27. The system of claim 23 wherein a reflective layer is provided on at least one surface of the volume fluorescent light unit.

28. The system of claim 27 wherein the reflective layer is transparent to light in the first wavelength range and substantially reflects light in the second wavelength range.

29. The system of claim 23 wherein the active chromophore layer comprises a phosphorescent material.

30. An illumination system comprising:
a first Lambertian source of incoherent light capable of generating light in a first wavelength range;
a volume fluorescent light unit comprising
a plurality of active chromophore layers, each sandwiched between two transparent layers, the transparent layers comprising a refractive index, and the active chromophore layers comprising an emitting material that, when illuminated by light in the first wavelength range, emits light in a second wavelength range, different from the first wavelength range, the active chromophore layers comprising an index of refraction that is within 0.1 of the refractive indexes of the transparent layers;
the volume fluorescent light unit having an extraction area, at least some of the light at the second wavelength being internally reflected within the volume fluorescent light unit to the extraction area.

31. The system of claim 30 wherein the active chromophore layers sandwiched between two transparent layers are stacked on top of one another.

32. The system of claim 30 wherein the active chromophore layers orthogonally bisect one another.

33. The system of claim 32 wherein the chromophore layers are orthogonal to boundary planes of the volume fluorescent light unit.

34. The system of claim 32 wherein the chromophore layers lie in a plane 45 degrees of an axis of the boundary planes of the volume fluorescent light unit.

* * * * *